United States Patent
Chun et al.

(10) Patent No.: US 11,867,425 B2
(45) Date of Patent: Jan. 9, 2024

(54) AIR CONDITIONER

(71) Applicant: SAMSUNG ELECTRONICS CO., LTD., Suwon-si (KR)

(72) Inventors: Sunghyun Chun, Suwon-si (KR); Junseok Kwon, Suwon-si (KR); Jihong Kim, Suwon-si (KR); Moonsun Shin, Suwon-si (KR); Wonhee Lee, Suwon-si (KR); Changsik Lee, Suwon-si (KR); Jaerim Jung, Suwon-si (KR); Changwoo Jung, Suwon-si (KR); Seoyoung Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 471 days.

(21) Appl. No.: 17/144,495

(22) Filed: Jan. 8, 2021

(65) Prior Publication Data
US 2021/0215389 A1   Jul. 15, 2021

(30) Foreign Application Priority Data
Jan. 10, 2020   (KR) .......................... 10-2020-0003816

(51) Int. Cl.
*F24F 13/20*   (2006.01)
*F24F 1/005*   (2019.01)
*F16H 25/14*   (2006.01)

(52) U.S. Cl.
CPC ............. *F24F 13/20* (2013.01); *F16H 25/14* (2013.01); *F24F 1/005* (2019.02)

(58) Field of Classification Search
CPC .......... F24F 13/20; F24F 13/084; F24F 1/005; F24F 1/0007; F16H 25/14; E05B 17/0025;
(Continued)

(56) References Cited

U.S. PATENT DOCUMENTS 3,504,617 A  *  4/1970  Merklin .................. F24F 13/20
                                                                165/122
4,418,951 A  *  12/1983  Schultz ................... E05C 3/041
                                                                292/202
(Continued)

FOREIGN PATENT DOCUMENTS

CN         1769795      *   5/2006
CN       101451760      *   6/2009
(Continued)

OTHER PUBLICATIONS

International Search Report dated Apr. 29, 2021, in corresponding International Patent Application No. PCT/KR2021/000282.

*Primary Examiner* — Janet M Wilkens
(74) *Attorney, Agent, or Firm* — STAAS & HALSEY LLP

(57) ABSTRACT

Disclosed is an air conditioner including a main body, a panel assembly configured to cover a front surface of the main body and coupled to the main body, and a cam assembly including a cam and disposed below the panel assembly, wherein the cam includes a cam contact surface formed along a rotation direction of the cam, the cam contact surface includes a first contact portion and a second contact portion formed to be in contact with the panel assembly at different heights, and the panel assembly is configured to be detachable from the main body by moving up and down with the rotation of the cam.

20 Claims, 13 Drawing Sheets

(58) Field of Classification Search
CPC ............. E05B 17/0033; E05B 17/0037; E05B 65/0003; E05B 65/006; E05B 65/0064; E05B 65/0089; E05C 3/00; E05C 3/004; E05C 3/02; E05C 3/04; E05C 3/041; E05C 3/042; E05C 3/046; E05C 7/04
USPC ...................... 312/236, 265.5, 265.6; 49/395
See application file for complete search history.

(56) References Cited

U.S. PATENT DOCUMENTS

| | | | |
|---|---|---|---|
| 5,957,292 A | | 9/1999 | Mikkelsen et al. |
| 8,104,850 B2 * | | 1/2012 | Hager ................... A47B 95/008 312/323 |
| 8,141,964 B1 * | | 3/2012 | Yu ......................... H05K 7/1487 312/265.5 |
| 8,315,052 B2 * | | 11/2012 | Chan .................... H05K 7/1488 312/265.5 |
| 2009/0072548 A1 * | | 3/2009 | Yang ...................... E05C 3/045 292/98 |
| 2019/0219278 A1 * | | 7/2019 | Lee ............................ B08B 1/04 |
| 2020/0096207 A1 * | | 3/2020 | Kim ...................... F24F 1/0073 |

FOREIGN PATENT DOCUMENTS

| | | | |
|---|---|---|---|
| CN | 206769604 U | | 12/2017 |
| CN | 108180543 B | | 3/2021 |
| EP | 3330630 | * | 6/2018 |
| JP | 2016217602 | * | 12/2016 |
| KR | 10-2006-0087295 A | | 8/2006 |
| KR | 10-2008-0055456 A | | 6/2008 |
| KR | 20-2009-0003440 U | | 4/2009 |
| KR | 10-1105756 B1 | | 1/2012 |
| KR | 20-0467240 Y1 | | 6/2013 |
| KR | 10-1281292 B1 | | 7/2013 |
| KR | 10-1466299 B1 | | 11/2014 |
| KR | 10-1817095 B1 | | 1/2018 |
| KR | 10-1948258 B1 | | 2/2019 |
| KR | 20220029169 | * | 3/2022 |

* cited by examiner

AIR CONDITIONER

CROSS-REFERENCE TO RELATED APPLICATION(S)

This application is based on and claims priority under 35 U.S.C. § 119 to Korean Patent Application No. 10-2020-0003816, filed on Jan. 10, 2020, in the Korean Intellectual Property Office, the disclosure of which is incorporated by reference herein in its entirety.

BACKGROUND

1. Field

The disclosure relates to an air conditioner, and more particularly, to a front panel lifting and separating structure of opening and closing a front panel of an air conditioner.

2. Description of the Related Art

In general, an air conditioner is a device that cools or heats a room using heat of vaporization and heat of liquefaction generated when a refrigerant is vaporized or liquefied in a refrigeration cycle in which a compressor, a condenser, an expansion valve, and an evaporator are connected by refrigerant pipes to form a closed circuit.

As one type of air conditioner, a separate type air conditioner includes an outdoor unit including a compressor, a condenser, and the like and installed outdoors, and an indoor unit including an evaporator and the like and installed indoors. The separate type air conditioner may be classified into a stand type that is erected on a floor and a wall-mounted type that is attached to an indoor wall.

The disclosure relates to an indoor unit of a stand type air conditioner, and hereinafter will be referred to as "air conditioner".

An air conditioner includes a main body formed in a box shape and having an open front, and a front panel for opening and closing the open front of the main body. The front panel is the first part to be opened or removed when an air conditioner is installed indoors or when the air conditioner is broken and needs to be repaired. In the case of an air purifier-integrated air conditioner that has been widely used in recent years, it is often necessary to open and close the front panel to clean the air conditioner or the air purifier filter.

Conventionally, an opening and closing structure using a hinge structure or the like has been applied to open and close the front panel, but the conventional opening and closing structure has poor durability and is difficult to replace. In addition, professional knowledge is required in the opening and closing process of the front panel, which increases service costs, and when a user directly opens or closes the front panel, the user's product liability (hereinafter referred to as PL) may occur.

SUMMARY

It is an aspect of the disclosure to provide an air conditioner capable of easily separating a front panel from a main body.

It is another aspect of the disclosure to provide an air conditioner capable of preventing a users safety accidents due to falling of a panel that may occur in a process of separating the panel from a main body or the operation of a fan exposed due to the open panel.

Additional aspects of the disclosure will be set forth in part in the description which follows and, in part, will be obvious from the description, or may be learned by practice of the disclosure.

In accordance with an aspect of the disclosure, an air conditioner includes a main body, a panel assembly configured to cover a front surface of the main body and coupled to the main body, and a cam assembly including a cam and disposed below the panel assembly, wherein the cam includes a cam contact surface formed along a rotation direction of the cam, the cam contact surface includes a first contact portion and a second contact portion formed to be in contact with the panel assembly at different heights, and the panel assembly is configured to be detachable from the main body by moving up and down with the rotation of the cam.

The cam may further include a rotation axis parallel to the ground, and the cam assembly may be configured to be detachable from the main body toward the front.

The panel assembly may include a lower hook formed at a lower end of the panel assembly, the main body may include a lower hook groove formed at a position corresponding to the lower hook of the main body so that the lower hook is caught on the lower hook groove, and the lower hook may be configured not to be separated from the lower hook groove even when the panel assembly is ascended by the rotation of the cam.

The cam assembly may further include a cam fixing frame and a cam handle disposed on a front surface of the cam fixing frame, the cam may be disposed on a rear surface of the cam fixing frame, and the cam handle and the cam may be coupled to each other with the cam fixing frame therebetween.

The cam fixing frame may include a handle seating groove formed on the front surface of the cam fixing frame to correspond to a shape of the cam handle, and a rim of the cam handle may be formed to be seated in the handle seating groove.

The cam fixing frame may further include a stopper formed in the handle seating groove, the cam handle may include a protrusion protruding from the rim, and the protrusion may be configured to restrict the rotation of the cam by being caught on the stopper.

The air conditioner may further include a cam assembly cover disposed in the front of the cam assembly and coupled to the cam assembly to cover the cam assembly.

The panel assembly may include an upper hook including a body protruding from the panel assembly toward the rear of the panel assembly and configured to be inserted into an upper hook groove formed at a position of the main body corresponding to the upper hook, and the upper hook may be configured such that the panel assembly is ascended by the rotation of the cam and is caught on the upper hook groove.

The panel assembly may further include a panel frame corresponding to a shape of the front surface of the main body, and a front cover disposed in the front of the panel frame to be coupled to the panel frame and configured to cover electric components and a fan inside the main body so that the electric components and the fan are not visible from the outside, and the upper hook may be configured to protrude from the pan& frame.

The upper hook may include a locking portion protruding upward from one end of the body.

The upper hook may include a first upper hook and a second upper hook, the first upper hook may be positioned above the second upper hook on the panel assembly, and a protruding height of the locking portion of the first upper hook may be provided lower than a protruding height of the locking portion of the second upper hook.

The upper hook groove may be formed to a height corresponding to the upper hook so that the upper hook is inserted into the upper hook groove without the locking portion being caught on the upper hook groove.

The panel assembly may further include a cam friction pad provided in a region where a lower end of the panel assembly and the cam are in contact with each other and protruding from the panel assembly toward the cam, and the cam friction pad may be configured to be detachable from the panel assembly.

The panel assembly may further include a sliding magnet mounted on an upper end of the panel assembly, and the main body may include a sliding plate provided at a position of the main body corresponding to the sliding magnet and configured such that the sliding magnet slides while being in contact with the sliding plate by a magnetic force.

The panel assembly may further include a lead magnet mounted on the panel assembly, and the main body may include a reed switch provided at a position of the main body corresponding to the lead magnet and configured to stop the rotation of a fan of the air conditioner when the panel assembly is separated from the main body.

In accordance with another aspect of the disclosure, an air conditioner includes a main frame disposed on a front surface of a main body of the air conditioner, a fan provided inside the main body, a cam assembly including a cam and disposed at a lower end of the main frame, and a panel positioned above the cam assembly to be in contact with the cam and configured to cover the front surface so that the fan is not visible from the outside, wherein the cam includes a first contact portion and a second contact portion positioned to support the panel by moving up and down by the rotation of the cam, and the first contact portion is spaced apart from a rotation axis of the cam by a first distance, and the second contact portion is spaced apart from the rotation axis by a second distance to be in contact with the panel at a position lower than a position where the first contact portion is in contact with the panel, thereby ascending and descending the panel.

The cam assembly may further include a cam fixing frame and a cam handle disposed on a front surface of the cam fixing frame, the cam may be disposed on a rear surface of the cam fixing frame, and the cam handle and the cam may be coupled to each other with the cam fixing frame therebetween.

The cam assembly may further include a cam fixing hook protruding from the cam fixing frame, the main frame may include a cam fixing groove provided at a position corresponding to the cam fixing hook, and the cam assembly may be configured to be detachable from the main frame toward the front.

The cam fixing frame may further include a stopper formed in a groove, the cam handle may include a protrusion protruding from a rim, and the protrusion may be configured to restrict the rotation of the cam by being caught on the stopper.

The panel may include an upper hook protruding from the panel toward the rear of the panel and configured to be inserted into an upper hook groove formed at a position of the main body corresponding to the upper hook, and the upper hook may be configured such that the panel is ascended by the rotation of the cam and is caught on the upper hook groove.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations shown in the embodiments and the drawings described in the present specification are only the preferred embodiments of the present disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "upward," "downward," "upper portion," "lower portion," "forward," and "rearward" used in the following description are defined with reference to the drawings, and the shape and position of each component are not limited by these terms.

Figure 2:
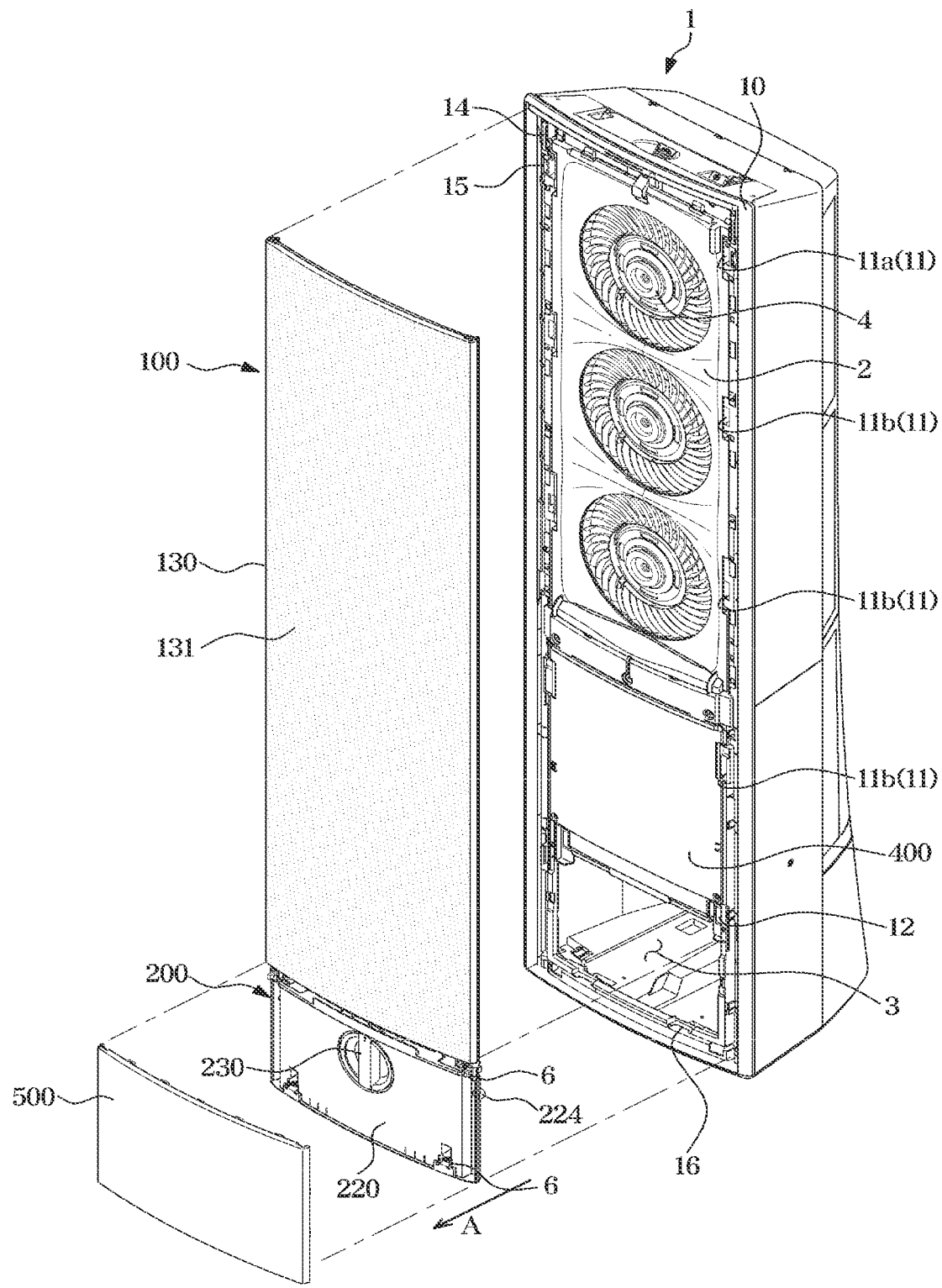
FIG. 2 is a perspective view of the air conditioner according to an embodiment of the disclosure in which a panel assembly, a cam assembly, and a cam assembly cover are separated from a main body.

Specifically, as illustrated in FIG. 2, a direction A in which a panel assembly 100 is separated from an air conditioner and is moved is defined as the front, and based on this, the rear, left and right and upper and lower sides are defined.

Hereinafter embodiments of the disclosure will be described in detail with reference to the accompanying drawings.

A refrigeration cycle of an air conditioner is composed of a compressor, a condenser, an expansion valve, and an evaporator. A refrigerant undergoes a series of processes comprising of compression, condensation, expansion, and evaporation, and a high temperature air is heat exchanged with a low temperature refrigerant to become a low temperature air and supplied to a room.

The compressor compresses a refrigerant gas to a high temperature and high pressure and then discharges the high temperature and high pressure gas, and the discharged refrigerant gas is introduced into the condenser. The condenser condenses the compressed refrigerant into a liquid phase and radiates heat to surroundings through the condensation process. The expansion valve expands a high temperature and high pressure liquid refrigerant condensed in the condenser into a low pressure liquid refrigerant. The evaporator evaporates the refrigerant expanded in the expansion valve and returns a low temperature and low pressure refrigerant gas to the compressor. The evaporator uses the latent heat of evaporation of a refrigerant to achieve a cooling effect by heat exchange with an object to be cooled. Through this cycle, an air temperature of an indoor space may be controlled.

An outdoor unit of an air conditioner refers to a device comprising of a compressor and an outdoor heat exchanger in a refrigeration cycle. An indoor unit of an air conditioner includes an indoor heat exchanger, and an expansion valve may be disposed in either the indoor unit or the outdoor unit of the air conditioner.

The disclosure relates to an air conditioner cooling an indoor space, and the outdoor heat exchanger functions as a condenser and the indoor heat exchanger functions as an evaporator. Hereinafter, for convenience, an indoor unit including an indoor heat exchanger is referred to as an air conditioner, and the indoor heat exchanger is referred to as a heat exchanger.

An air conditioner includes a main body 1 having an inlet (not shown) and an outlet (not shown), a heat exchanger (not shown) configured to heat exchange with air introduced into the main body 1, and a fan 4 configured to circulate air through the inside or outside of the main body 1. The main body 1 may be used to be referred to as an air conditioner. The main body 1 may include a panel assembly 100, and a main frame 10 coupled to and fixed to the main body 1 in the front of the body 1 facing a cam assembly 200.

The air conditioner may include the panel assembly 100 configured to cover a front surface of the main body 1. The panel assembly 100 may include a panel frame 101 and a front cover 130 disposed in the front of the panel frame 101.

A specific structure of the panel assembly 100 will be described later. The term panel may have the same meaning as the panel assembly 100.

The front cover 130 may be configured to form the overall appearance of the air conditioner. The front cover 130 may include a plurality of holes 131. The plurality of holes 131 may be distinguished from the outlet (not shown). The plurality of holes 131 may be distributed on the front cover 130 as illustrated in FIG. 1.

Figure 1:
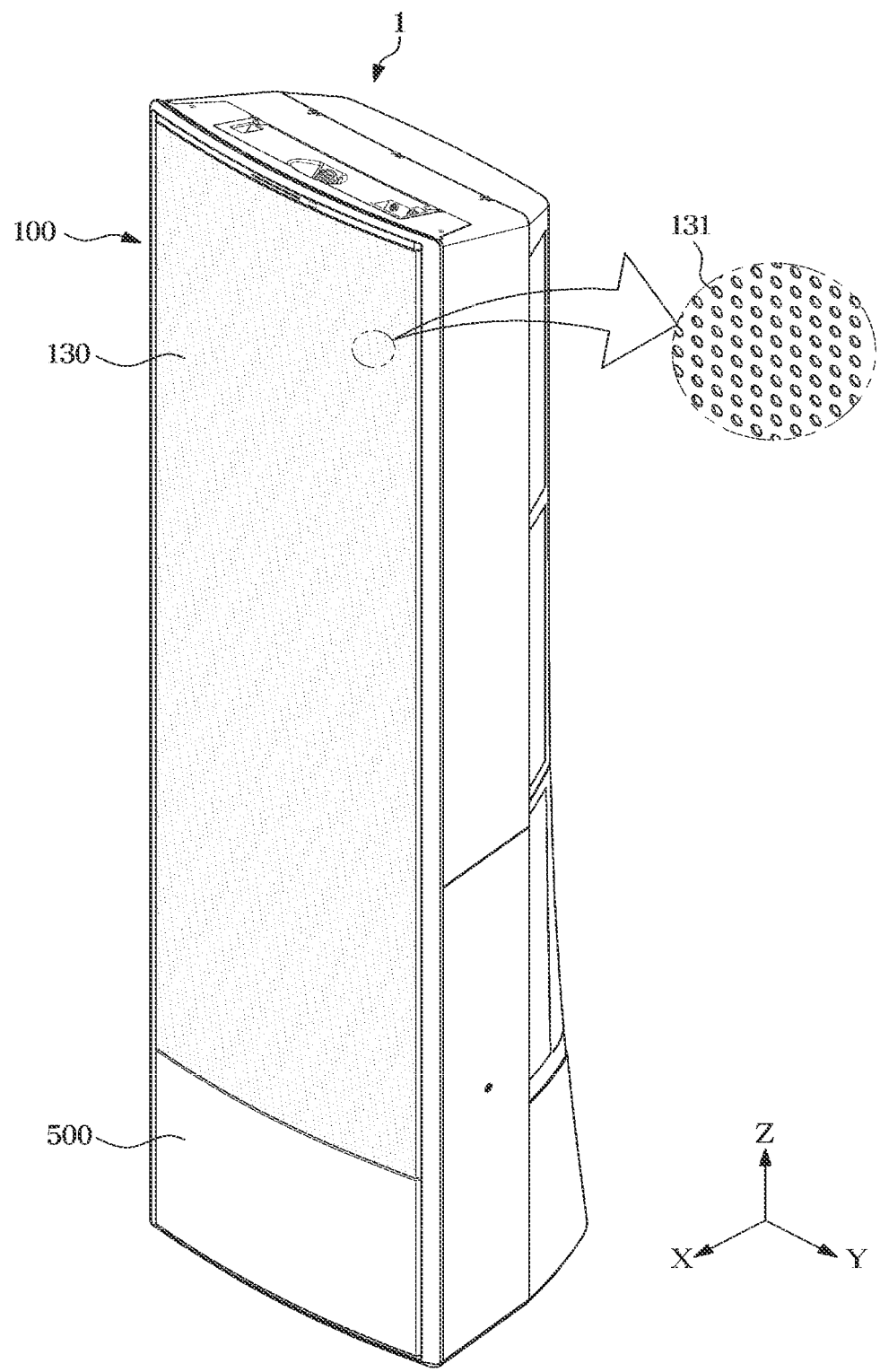
FIG. 1 is an overall perspective view of an air conditioner according to an embodiment of the disclosure.

The plurality of holes 131 may be distributed to be spaced apart from each other at a predetermined interval as illustrated in FIG. 1, but the disclosure is not limited thereto and the plurality of holes 131 may be concentrated and distributed in a specific area of the front cover 130. Through this structure, a user does not directly encounter cooling wind, and the purpose of air conditioning may be achieved, thereby improving the user's satisfaction.

Unlike this, the main outlet (not shown) corresponding to the location and shape of the fan 4 may be formed in the panel assembly 100 to discharge cooled air. However, the air conditioner according to an embodiment of the disclosure will be described based on the panel assembly 100 in which the plurality of holes 131 is formed on a front surface thereof.

Referring to FIG. 2, the panel assembly 100 may be configured such that the fan 4, a fan cover 2 to cover the fan 4 inside the main body 1, electrical components (not shown) inside the main body 1, and the main frame 10 are not visible from the outside. The panel assembly 100 may have a discharge structure for discharging the air cooled by the air conditioner to the outside. The plurality of holes 131 described above may be an embodiment of the discharge structure.

The panel assembly 100 may be coupled to the main body 1 through a fastening structure. Specifically, the panel assembly 100 may be coupled to the main frame 10 coupled to and fixed to the main body 1 in the front of the main body 1.

The cam assembly 200 may be provided below the panel assembly 100. The cam assembly 200 may include a cam 210 to configure a lifting structure of the panel assembly 100 used to separate the panel assembly 100 from the main body 1. A lower end of the panel assembly 100 and the cam 210 of the cam assembly 200 may be provided to be in contact with each other. The lifting structure of the panel assembly 100 will be described later.

The cam assembly 200 may be coupled to the main body 1 through a fastening structure. Specifically, the panel assembly 100 may be coupled to the main frame 10 coupled to and fixed to the main body 1 in the front of the main body 1. A specific fastening structure will be described later.

Referring to FIG. 2, in a state in which the cam assembly 200 is coupled to the main frame 10 of the main body 1, an inner cover 400 may be provided above the cam assembly 200 to be coupled to the main frame 10. The inner cover 400 may be provided to prevent the electrical components (not shown) inside the main body 1 from being immediately visible when the panel assembly 100 is separated from the main body 1. The inner cover 400 may secondarily prevent dust and other contaminants from entering the electrical component (not shown) inside the main body 1.

Specifically, the purpose of the user separating the panel assembly 100 is mainly to clean dust accumulated on a rear surface of the panel assembly 100, that is, a rear surface of the front cover 130, or to clean dust accumulated on the fan 4 and the fan cover 2. In this case, when the inner cover 400 is not provided, in a state in which the panel assembly 100 is separated, the electrical components (not shown) inside the main body 1 may be directly viewed, thereby deteriorating the aesthetics. In addition, in the case in which the inner cover 400 is not provided, in a state in which the panel assembly 100 is separated, when the user accidentally touches the electrical components (not shown) inside the main body 1, the air conditioner may break down or the user may be electrically shocked. When the inner cover 400 is coupled to the main frame 10, the above problems may be solved.

Referring to FIG. 2, in a state in which the cam assembly 200 is coupled to the main frame 10 of the main body 1, the cam assembly cover 500 may be disposed on a front surface of the cam assembly 200. The cam assembly cover 500 may be configured to cover the front surface of the cam assembly 200 so that the cam assembly 200 is not visible from the outside. That is, the cam assembly cover 500 may be configured in a shape corresponding to a shape of the cam assembly 200.

Referring to FIG. 2, the cam assembly cover 500 may be provided to be coupled to the cam assembly 200. That is, the cam assembly cover 500 may be configured to be coupled to the cam assembly 200 after the cam assembly 200 is coupled to the main frame 10 of the main body 1. Unlike this, the cam assembly cover 500 may be configured to be directly coupled to the main frame 10 of the main body 1. Hereinafter a description will be given based on a configuration in which the cam assembly cover 500 is coupled to the cam assembly 200.

Referring to FIG. 2, the cam assembly cover 500 may include a cam assembly cover fastening ring (not shown) formed on the cam assembly cover 500. The cam assembly cover fastening ring (not shown) may be inserted into and caught on a cam assembly cover fastening groove 6 so that the cam assembly cover 500 may be coupled to the cam assembly 200.

Referring to FIG. 1, the panel assembly 100 and the cam assembly cover 500 may be configured to perfectly cover a front surface of the air conditioner in a state of being coupled to the main body 1 and the cam assembly 200, respectively. The cam assembly cover 500 may have the same shape as the plurality of holes 131 formed on the front cover 130 of the panel assembly 100 in order to maintain consistency in appearance with the panel assembly 100.

Figure 3:
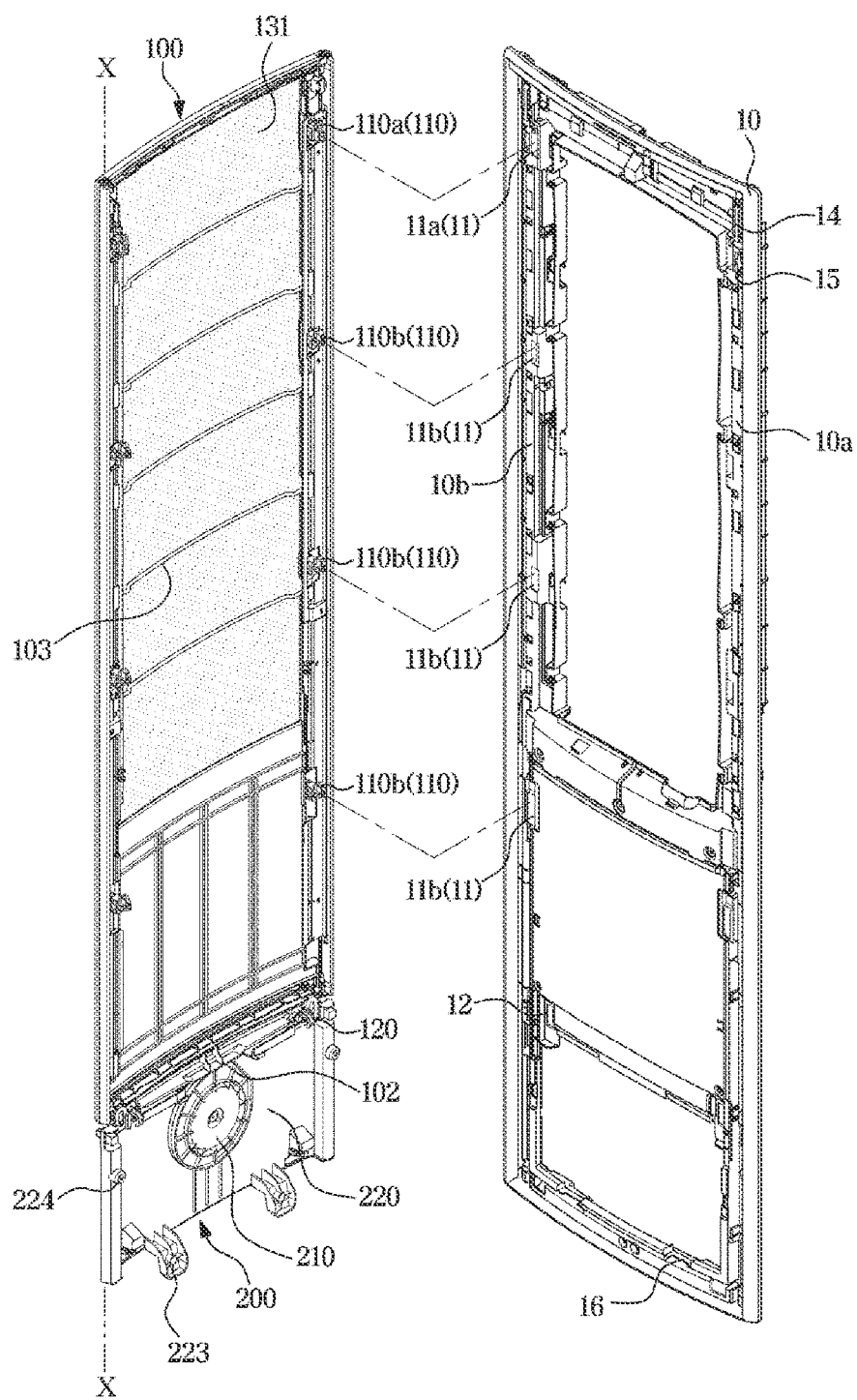
FIG. 3 illustrates a rear surface and a main frame of the panel assembly in FIG. 2.

FIG. 3 illustrates the rear surface and the main frame 10 of the panel assembly 100 in FIG. 2.

Referring to FIG. 3, the panel assembly 100 may include an upper hook 110 including a body 111 protruding from the panel assembly 100 toward the rear of the panel assembly 100. An upper hook groove 11 formed at a position corresponding to the upper hook 110 may be provided on the main body 1 of the air conditioner, specifically, the main frame 10. The upper hook 110 may be configured to be caught on the upper hook groove 11 when the panel assembly 100 is ascended by the rotation of the cam 210. As illustrated in FIG. 3, the upper hook groove 11 may be formed on the main frame 10, but the upper hook groove 11 may be formed on a separate auxiliary frame, and the auxiliary frame may be coupled to the main frame 10. The separate auxiliary frame may include a right auxiliary frame 10a and a left auxiliary frame 10b. Alternatively, an auxiliary frame (not shown) integrated into a "c" shape or a "⊔" shape may be inserted into and coupled to a groove on the main frame 10. This structure is to supplement the rigidity due to a material of the main frame 10 or a lightweight structure in order to reduce a weight of the air conditioner. The coupling structure of the panel assembly 100, the upper hook 110, and the main frame 10 will be described later.

Referring to FIG. 3, the cam assembly 200 may include a cam fixing hook 223 protruding from a cam fixing frame 220. The cam assembly 200 may include a cam frame fixing hole 224 formed on a rear surface of the cam assembly 200. The main body 1 of the air conditioner, specifically, the main frame 10 may include a cam fixing groove 16 formed at a position corresponding to the cam fixing hook 223.

In addition to separating the panel assembly 100 from the main body 1, the user may separate the cam assembly 200 from the main body 1, specifically the main frame 10, toward the front.

The cam fixing hook 223 may be caught on the cam fixing groove 16 formed at the position corresponding to the cam fixing hook 223. The cam fixing frame 220 may be coupled to the main frame 10 through the cam frame fixing hole 224, a hole formed on the main frame 10 to correspond to the cam frame fixing hole 224, and a separate fastening member. The user may remove the fastening member in the cam frame fixing hole 224 and separate the cam fixing hook 223 from the cam fixing groove 16 to separate the cam assembly 200 from the main frame 10 toward the front. Through this structure, the cam assembly 200 supporting the panel assembly 100 may be easily repaired, and protection and accessibility of the electrical components disposed at a lower end portion of the main body 1 of the air conditioner may be secured.

Figure 4:
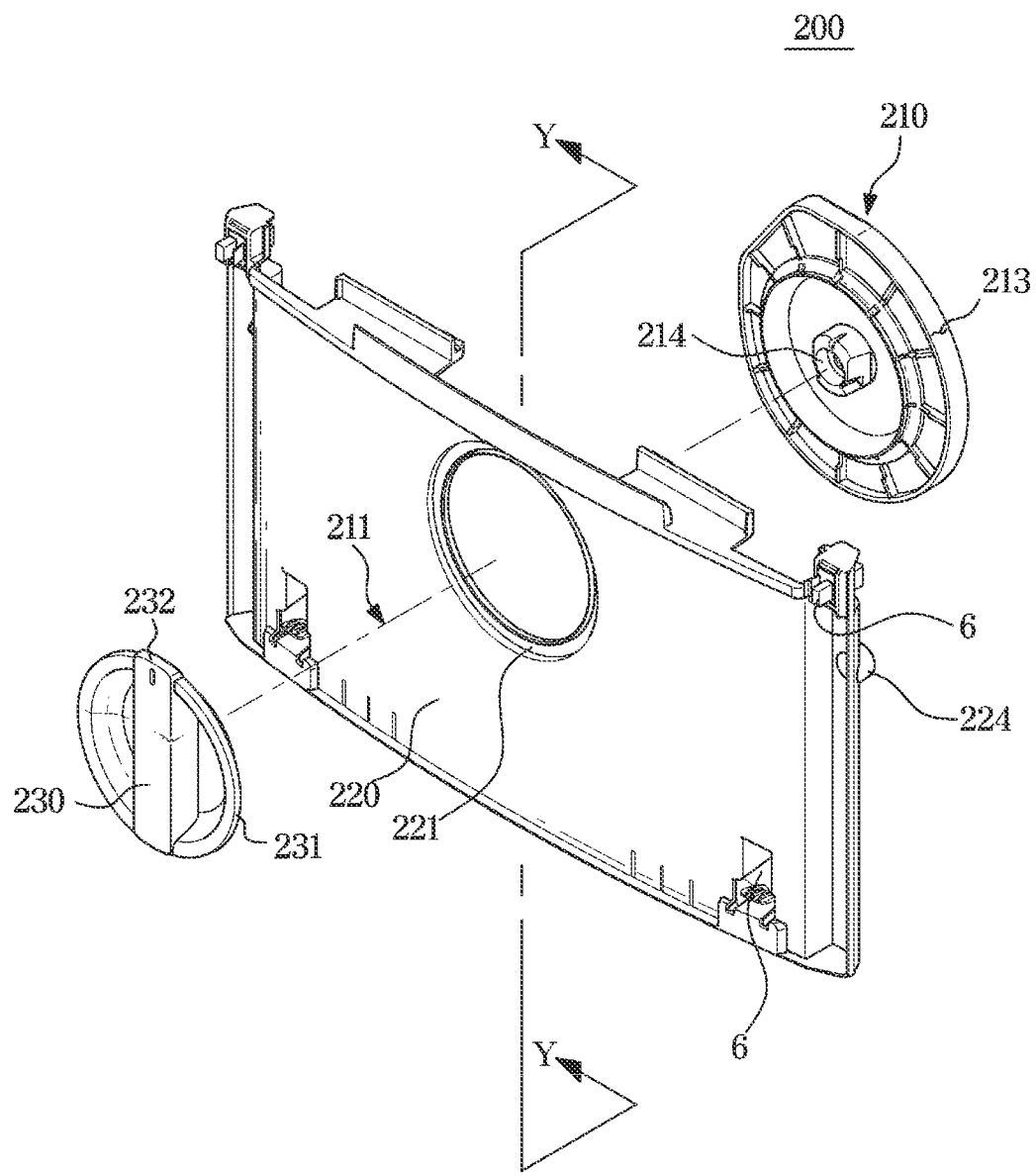
FIG. 4 is an exploded perspective view of the cam assembly of the air conditioner according to an embodiment of the disclosure.
Figure 5:
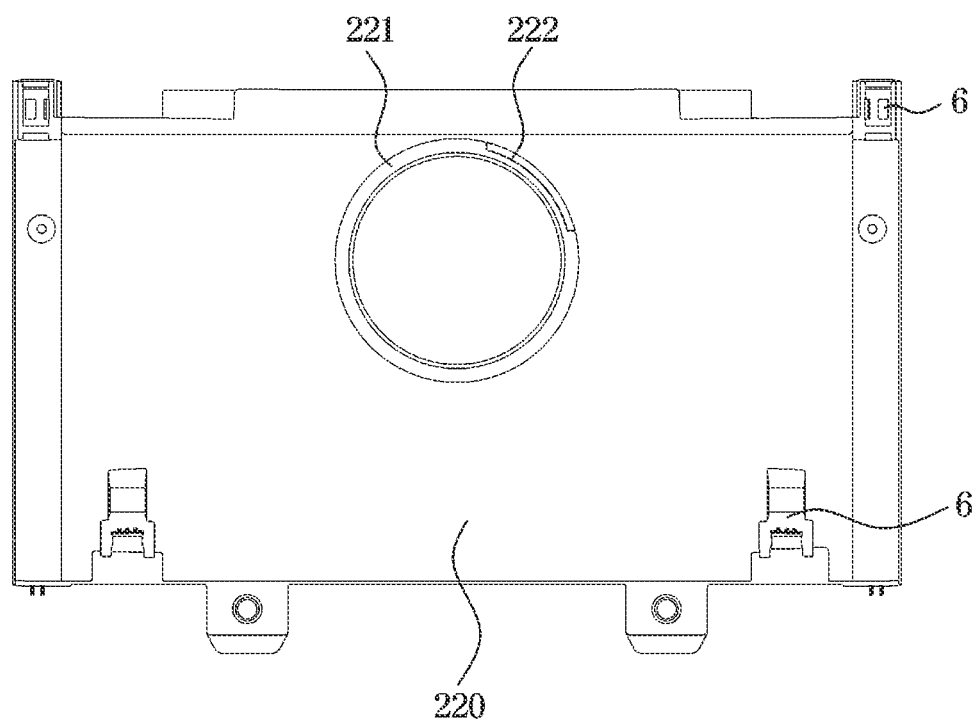
FIG. 5 is a front view of a cam fixing frame in FIG. 4.
Figure 6:
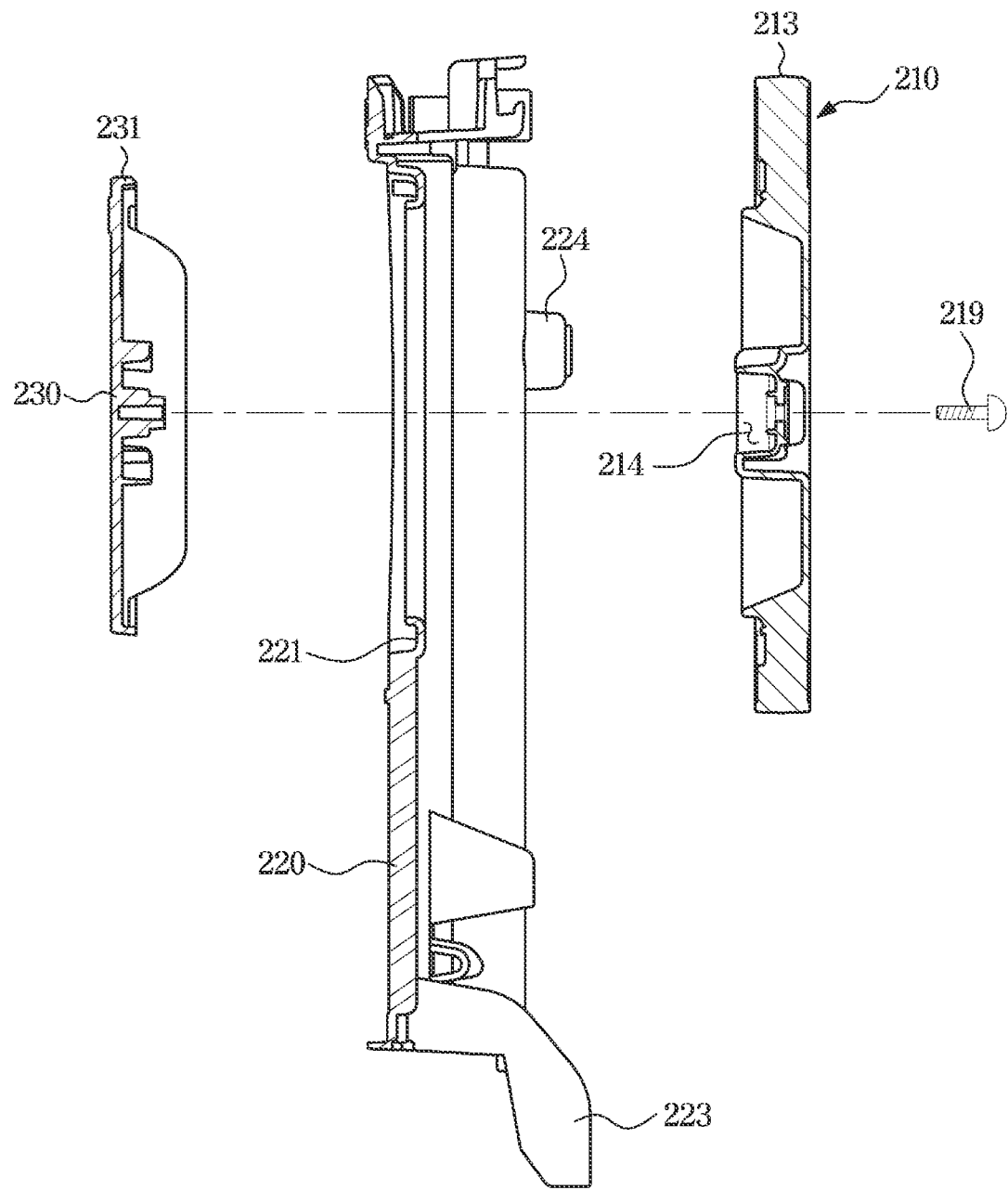
FIG. 6 is a cross-sectional view taken along line Y-Y including a rotation axis in FIG. 4.

FIG. 4 is an exploded perspective view of the cam assembly 200 of the air conditioner according to an embodiment of the disclosure, FIG. 5 is a front view of the cam fixing frame 220 in FIG. 4, and FIG. 6 is a cross-sectional view taken along line Y-Y including a rotation axis 211 in FIG. 4.

Referring to FIG. 4, the cam assembly 200 may include the cam fixing frame 220 and a cam handle 230 disposed on a front surface of the cam fixing frame 220. The cam handle 230 may be formed in a substantially circular dish shape. The cam assembly 200 may include the cam 210. The cam 210 may rotate based on the rotation axis 211 parallel to the ground. The cam 210 may be configured such that a distance from a rotation center 212 of the cam 210 to a cam contact surface 213 where the cam 210 and the panel assembly 100 are in contact with each other decreases as the cam 210 rotates in a counterclockwise direction B (see FIG. 10) to increase a rotation angle of the cam 210, thereby descending the panel assembly 100. The cam 210 may be disposed on a rear surface of the cam fixing frame 220. The cam handle 230 and the cam 210 may be disposed to be coupled to each other with the cam fixing frame 220 interposed therebetween. A specific shape of the cam 210 will be described later.

Referring to FIGS. 4 to 6, the cam fixing frame 220 may include a handle seating groove 221 formed to correspond to a shape of the cam handle 230 on the front surface of the cam fixing frame 220. A rim 231 of the cam handle 230 may be provided to be seated in the handle seating groove 221. That is, the cam handle 230 may be coupled to the cam 210 with the cam fixing frame 220 therebetween after the rim 231 of the cam handle 230 is seated in the handle seating groove 221. Specifically, referring to FIG. 6, a protrusion formed at a central portion of a rear surface of the cam handle 230 may be inserted into a corresponding handle fixing groove 214 formed on the cam 210. The cam handle 230 and the cam 210 may be firmly coupled to each other through a fastening member 219.

The cam handle 230 and the cam 210 may be configured to be coupled to each other through a separate shaft (not shown) formed in a cylindrical shape. However, compared to the structure of being coupled through the shaft (not shown), the structure in which the handle seating groove 221 corresponding to the shape of the cam handle 230 is formed on the front surface of the cam fixing frame 220 and the rim 231 of the cam handle 230 is seated in the handle seating groove 221 may secure more improved durability of the cam assembly 200 by distributing the load applied to a rotating body over a wider area.

Figure 10:
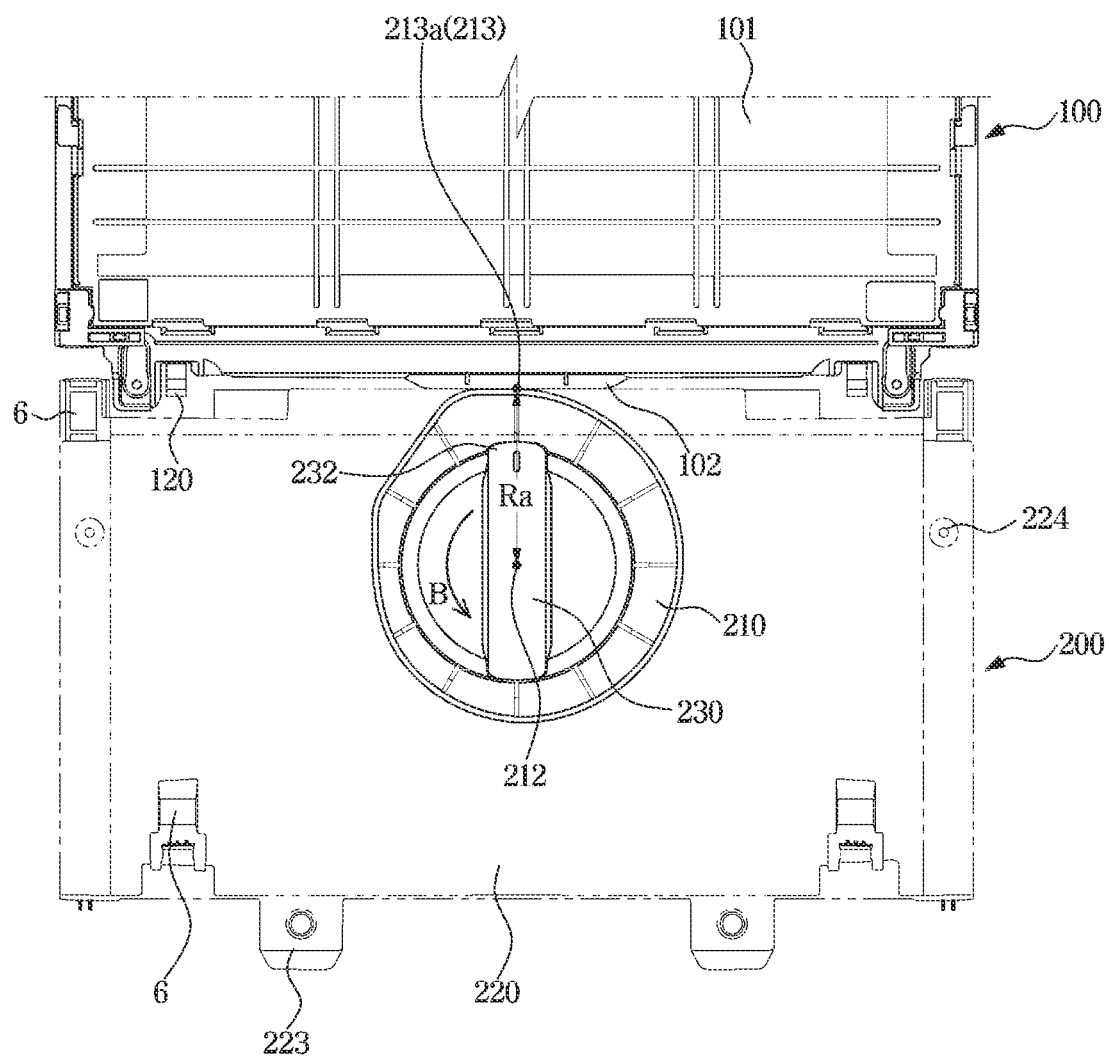
FIG. 10 illustrates a state in which a cam contact surface is the farthest spaced apart from the rotation axis of the air conditioner according to an embodiment of the disclosure.

Referring to FIG. 4, the user may grasp the cam handle 230 by hand to rotate the cam handle 230 in a clockwise direction or the counterclockwise direction B (see FIG. 10). The cam handle 230 may include a recess in which the user's fingers may be accommodated in an area grasped by the user by hand. Because the cam handle 230 and the cam 210 are coupled to each other with the cam fixing frame 220 interposed therebetween, as the user rotates the cam handle 230, the cam 210 may also be rotated on the rear surface of the cam fixing frame 220 in the same direction.

Referring to FIGS. 4 and 5, the cam fixing frame 220 may include a stopper 222 provided in the handle seating groove 221. The cam handle 230 may include a protrusion 232 protruding from the rim 231. The protrusion 232 may be provided to restrict the rotation of the cam 210 by being caught on the stopper 222.

Specifically, the stopper 222 may be formed to protrude from one surface of the handle seating groove 221 toward the center of the cam handle 230. When the cam handle 230 is formed in a circular shape, the handle seating groove 221 is also formed in a circular shape corresponding to the cam handle 230, so that the stopper 222 may be formed over a certain section along an inner circumferential surface of the handle seating groove 221 on the handle seating groove 221. The section in which the stopper 222 is formed along the inner circumferential surface of the handle seating groove 221 may be changed depending on the design of the lifting structure of the panel assembly 100. Specifically, the air conditioner to which the lifting structure of the panel assembly 100 is applied may vary in size and product, and may be modified depending on the spacing of a gap 600 (see FIG. 13) provided for the user to put his or her hand in to separate the panel assembly 100 from the main body 1. For example, in the case of an air conditioner having a relatively high height, there is a need to be designed such that the gap 600 (see FIG. 13) provided for the user to put his or her hand therein to separate the panel assembly 100 from the main body 1 is large. In this case, the section in which the stopper 222 is formed along the inner circumferential surface of the handle seating groove 221 may be formed short. When the formation section of the stopper 222 is short, a section in which the distance from the rotation center 212 to the cam contact surface 213 where the cam 210 and the panel assembly 100 in contact with each other decreases may be secured longer, so that the panel assembly 100 may be provided to descend farther than the spacing of the gap 600 (see FIG. 13). A detailed structural relationship between the cam 210 and the panel assembly 100 will be described later.

Figure 7:
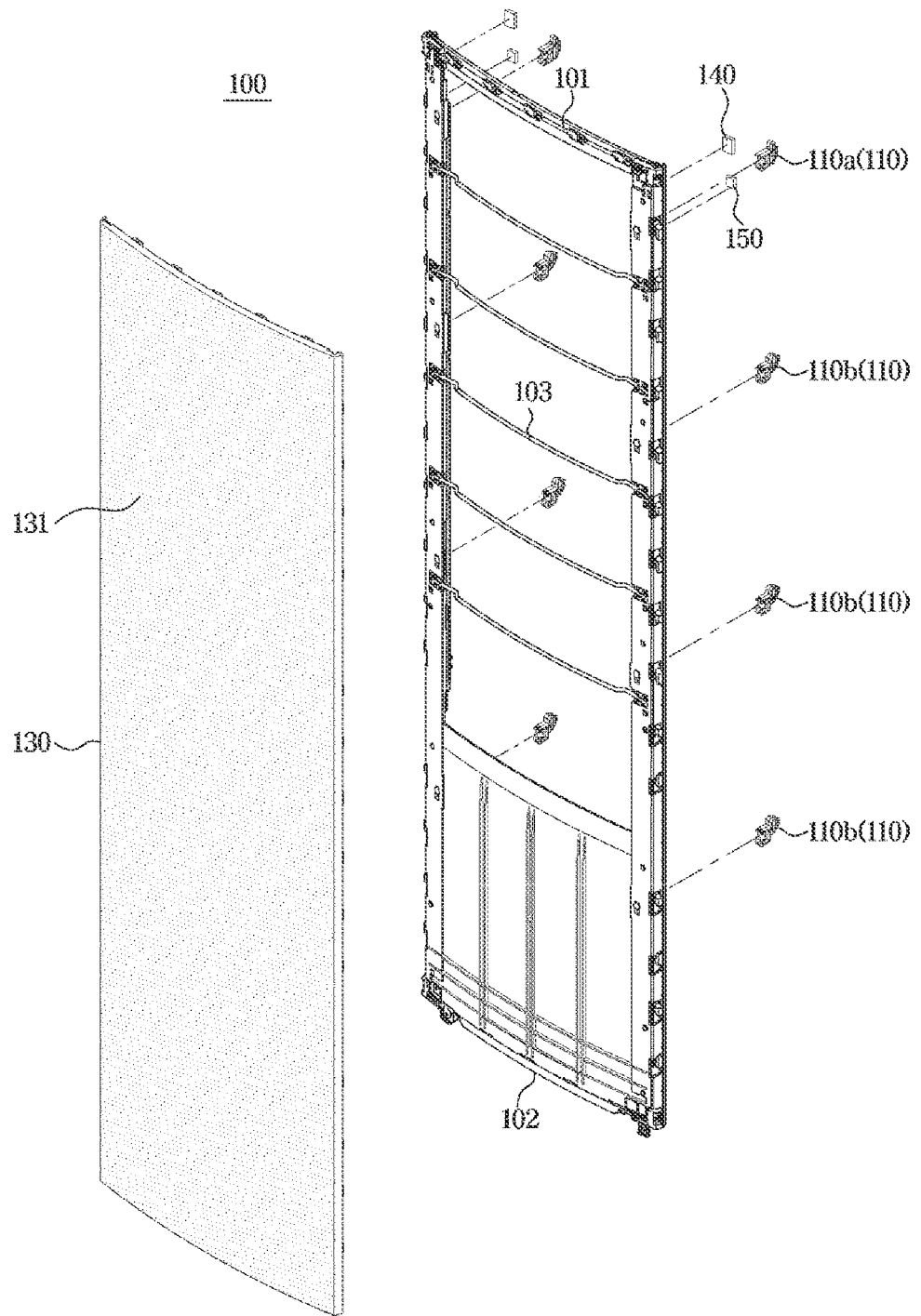
FIG. 7 is an exploded perspective view of the panel assembly of the air conditioner according to an embodiment of the disclosure.
Figure 8:
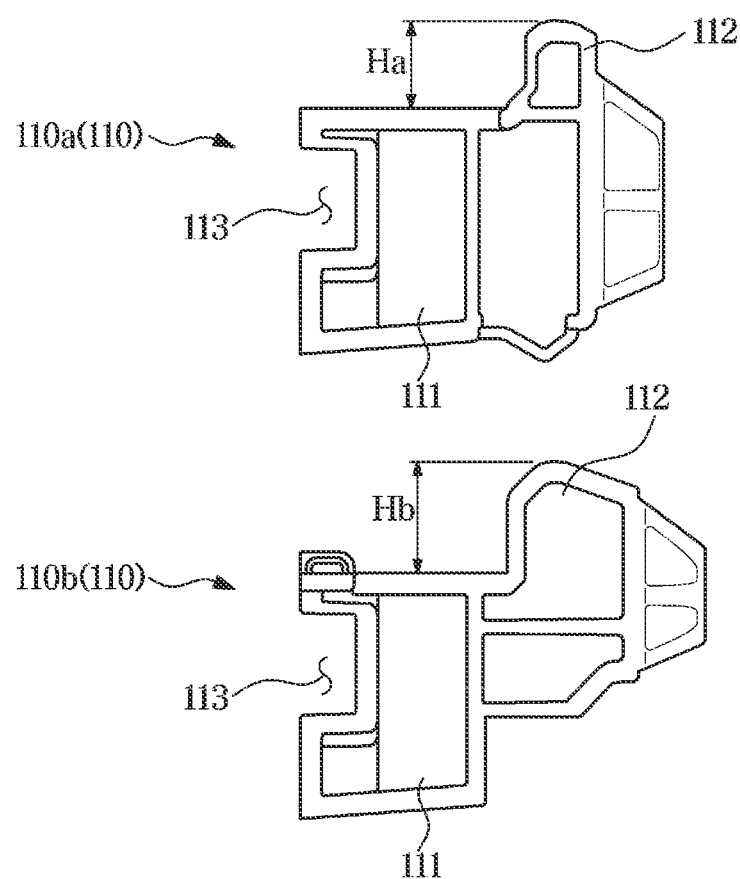
FIG. 8 is a side view of a first upper hook and a second upper hook in FIG. 7.

FIG. 7 is an exploded perspective view of the panel assembly 100 of the air conditioner according to an embodiment of the disclosure, and FIG. 8 is a side view of a first upper hook 110a and a second upper hook 110b in FIG. 7.

Referring to FIG. 7, the panel assembly 100 may include the panel frame 101 corresponding to a shape of a front surface of the main body 1 and the front cover 130 disposed in the front of the panel frame 101. The panel frame 101 may be formed in a substantially rectangular shape to correspond to the shape of the front surface of the main body 1. The panel assembly 100 may further include the upper hook 110 and a lower hook 120 (see FIG. 3).

The front cover 130 may be configured to cover the electrical components (not shown) and the fan 4 inside the main body 1 so that the electrical components and the fan 4 are not visible from the outside. The plurality of holes 131 may be formed on the front cover 130. A plurality of auxiliary supports 103 may be provided on the panel frame 101 to support the front cover 130. The front cover 130 may be coupled to the panel frame 101 in a manner of covering a structure, in which the plurality of auxiliary supports 103 is inserted into grooves formed on the panel frame 101, from the front. The auxiliary support 103 is formed in a thin and long cylindrical shape, and may be provided to be bent convexly toward the front to support the front cover 130.

The panel assembly 100 may include the lower hook 120 formed at the lower end of the panel assembly 100. Specifically, the lower hook 120 may be formed at the lower end of the panel frame 101 and may be integrally formed with the panel frame 101. Unlike this, the lower hook 120 may be formed separately and provided in a manner that is coupled to the panel frame 101.

The lower hook 120 may be configured to be caught on a lower hook groove 12 formed at a position corresponding to the lower hook 120 of the main body 1 (see FIG. 3). When combining the separated panel assembly 100 to the main body 1 of the air conditioner, the user may tilt the panel assembly 100 and approach the main body 1 and then firstly engage the lower hook 120 in the lower hook groove 12. Thereafter, the user may erect the panel assembly 100 perpendicular to the ground and completely insert the upper hook 110 into the upper hook groove 11. Immediately after insertion, the lower end of the panel assembly 100 may be supported in contact with the cam 210 in a state in which the panel assembly 100 is erected perpendicular to the ground (see FIG. 11). Also, immediately after insertion, a support surface 121 of the lower hook 120 may be supported by a lower hook support flange 12a formed on the main body 1 in the state in which the panel assembly 100 is erected perpendicular to the ground (see FIG. 13).

The panel assembly 100 includes the upper hook 110 protruding to the rear of the panel frame 101, which may be inserted into the upper hook groove 11 formed at a position of the main body 1 corresponding to the upper hook 110.

As illustrated in FIG. 7, a plurality of the upper hooks 110 may be provided. FIG. 7 illustrates a total of eight of the upper hooks 110 forming a pair, but the disclosure is not limited thereto. That is, the number of the upper hooks 110 may be smaller or larger than the number described above, and the upper hooks 110 may be formed in an odd number. The upper hook 110 may include the first upper hook 110a and the second upper hook 110b. The first upper hook 110a may be provided above the second upper hook 110b on the panel assembly 100. A plurality of the upper hooks 110 may be disposed to be spaced apart from each other by a predetermined distance and formed to protrude from the panel frame 101.

Referring to FIGS. 7 and 8, the upper hook 110 may include the body 111 protruding from the panel assembly 100 toward the rear of the panel assembly 100. The upper hook 110 may include a hook fastening recess 113 formed on a surface facing the panel frame 101. A protrusion having a shape corresponding to the hook fastening recess 113 may be formed in a region of the panel frame 101 to which the upper hook 110 is coupled. After the hook fastening recess 113 and the protrusion are engaged and fixed, the upper hook 110 and the panel frame 101 may be coupled to each other through a separate fastening member. Unlike this, the upper hook 110 may be integrally formed with the panel frame 101.

The upper hook 110 may include a locking portion 112 protruding upward from one end of the body 111.

As illustrated in FIG. 8, a protruding height Ha of the locking portion 112 of the first upper hook 110a may be provided lower than a protruding height Hb of the locking portion 112 of the second upper hook 110b. As the protruding height Ha is provided lower than the protruding height Hb, the user may separate the first upper hook 110a more easily than the second upper hook 110b from the upper hook groove 11 when separating the panel assembly 100 from the main body 1. As the protrusion height Hb is provided higher than the protrusion height Ha, a structure in which the panel assembly 100 is stably ascended and descended in a state of being erected perpendicular to the ground may be implemented.

Referring to FIG. 7, the panel assembly 100 may further include a sliding magnet 140 and a lead magnet 150 mounted on an upper end of the panel assembly 100.

The sliding magnet 140 may be configured to be in contact with a sliding plate 14 provided at a position of the main body 1 corresponding to the sliding magnet 140 by a magnetic force in the state in which the panel assembly 100 is erected perpendicular to the ground. The sliding magnet 140 may be configured to slide while always in contact with the sliding plate 14 by the magnetic force even when the panel assembly 100 is ascended or descended. The user may rotate the cam 210 to descend the panel assembly 100 to the lowest height, thereby making the upper hook 110 detachable from the upper hook groove 11. Because the sliding magnet 140 and the sliding plate 14 are always in contact with each other by the magnetic force, as long as a separate external force is applied, a situation in which the panel assembly 100 is inclined toward the user may be prevented.

The lead magnet 150 may be configured to face a reed switch 15 provided at a position of the main body 1 corresponding to the lead magnet 150 in the state in which the panel assembly 100 is erected perpendicular to the ground. The lead magnet 150 may be configured to always face the reed switch 15 even when the panel assembly 100 is ascended or descended. The reed switch 15 may be configured to stop the rotation of the fan 4 of the air conditioner when the user separates the panel assembly 100 from the main body 1 by an external force. That is, because the fan 4 does not rotate even when the panel assembly 100 is completely separated from the main body 1 by applying a separate external force and the fan 4 is exposed to the outside, safety of the user may be sufficiently secured.

Figure 9:
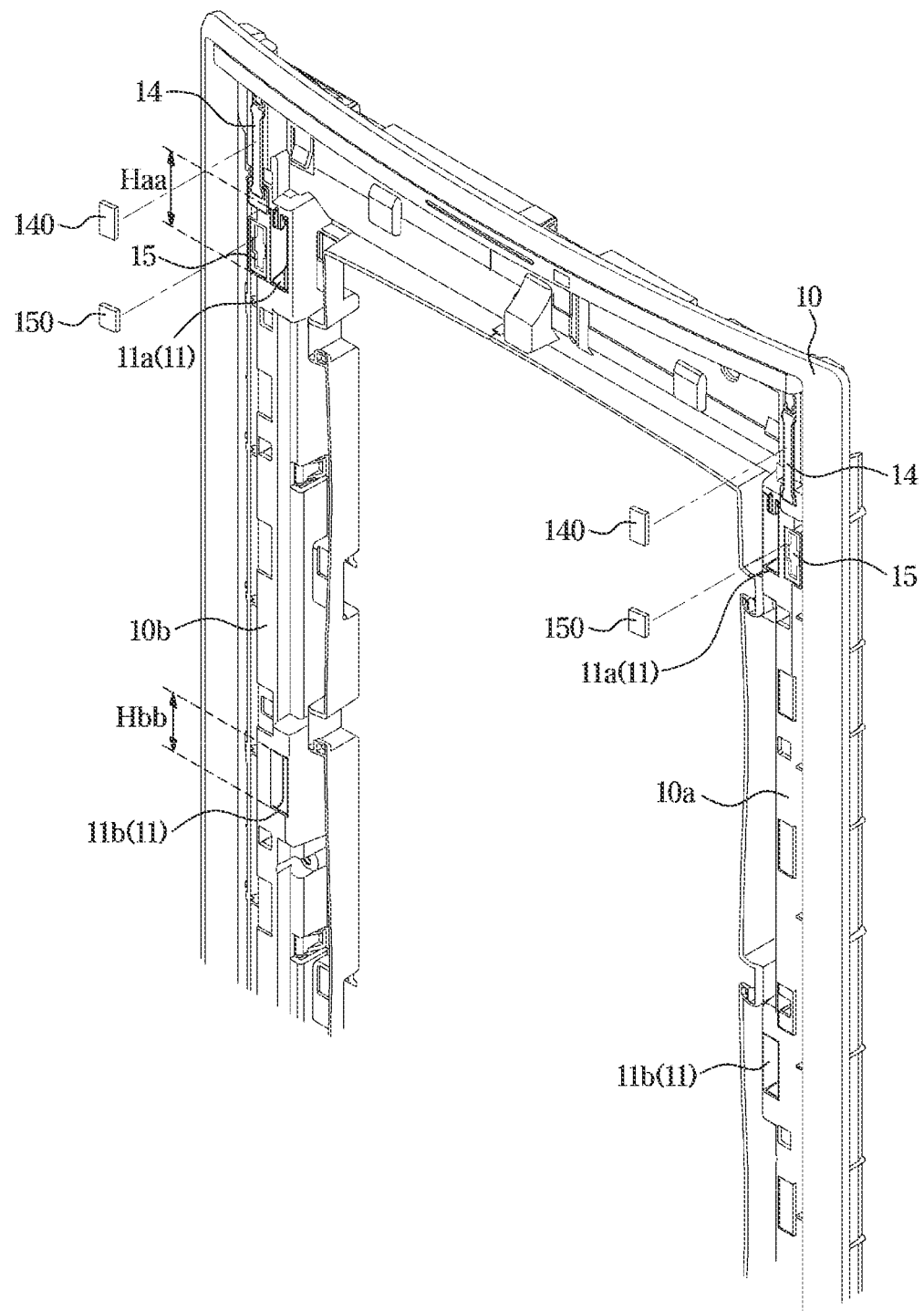
FIG. 9 is an enlarged view of a region of an upper portion of the main frame in FIG. 3.

FIG. 9 is an enlarged view of a region of an upper portion of the main frame 10 in FIG. 3.

The upper hook groove 11 formed at a position of the main body 1 corresponding to the upper hook 110 may be provided on the main body 1 of the air conditioner, specifically the main frame 10. The upper hook 110 may be configured to be caught on the upper hook groove 11 as the panel assembly 100 is ascended by the rotation of the cam 210.

The upper hook groove 11 may be formed at a height corresponding to the upper hook 110 so that the upper hook 110 is inserted or removed without the locking portion 112 being caught on the upper hook groove 11. The upper hook 110 may include the first upper hook 110a and the second upper hook 110b. The upper hook groove 11 formed at the position of the main body 1 corresponding to the upper hook 110 may also include a first upper hook groove 11a and a second upper hook groove 11b. Because it is sufficient if the first upper hook groove 11a and the second upper hook groove 11b are formed at a height corresponding to the upper hook 110 in a range in which the locking portion 112 is not caught on the upper hook groove 11, a height Haa of the first upper hook groove 11a may be provided equal to a height Hbb of the second upper hook groove 11b.

The main frame 10 may include the sliding plate 14 and the reed switch 15. The sliding plate 14 may be provided at a position of the main frame 10 corresponding to the sliding magnet 140. The reed switch 15 may be provided at a position of the main frame 10 corresponding to the lead magnet 150.

Referring to FIG. 9, the sliding plate 14 may be disposed above the reed switch 15 on the main frame 10. In a case where the magnetic forces acting to the sliding plate 14 and the sliding magnet 140 are the same, the sliding plate 14 may be supported more stably by the principle of a lever when the sliding plate 14 is disposed above the reed switch 15 on the main frame 10. That is, when the sliding plate 14 is disposed above the reed switch 15 on the main frame 10, a magnetic force may be applied at a point further away from a point where the support surface 121 of the lower hook 120 and the lower hook support flange 12a formed on the main body 1 are in contact with each other. However, the arrangement relationship is not limited thereto, and the sliding plate 14 may be disposed below the reed switch 15 on the main frame 10.

Figure 11:
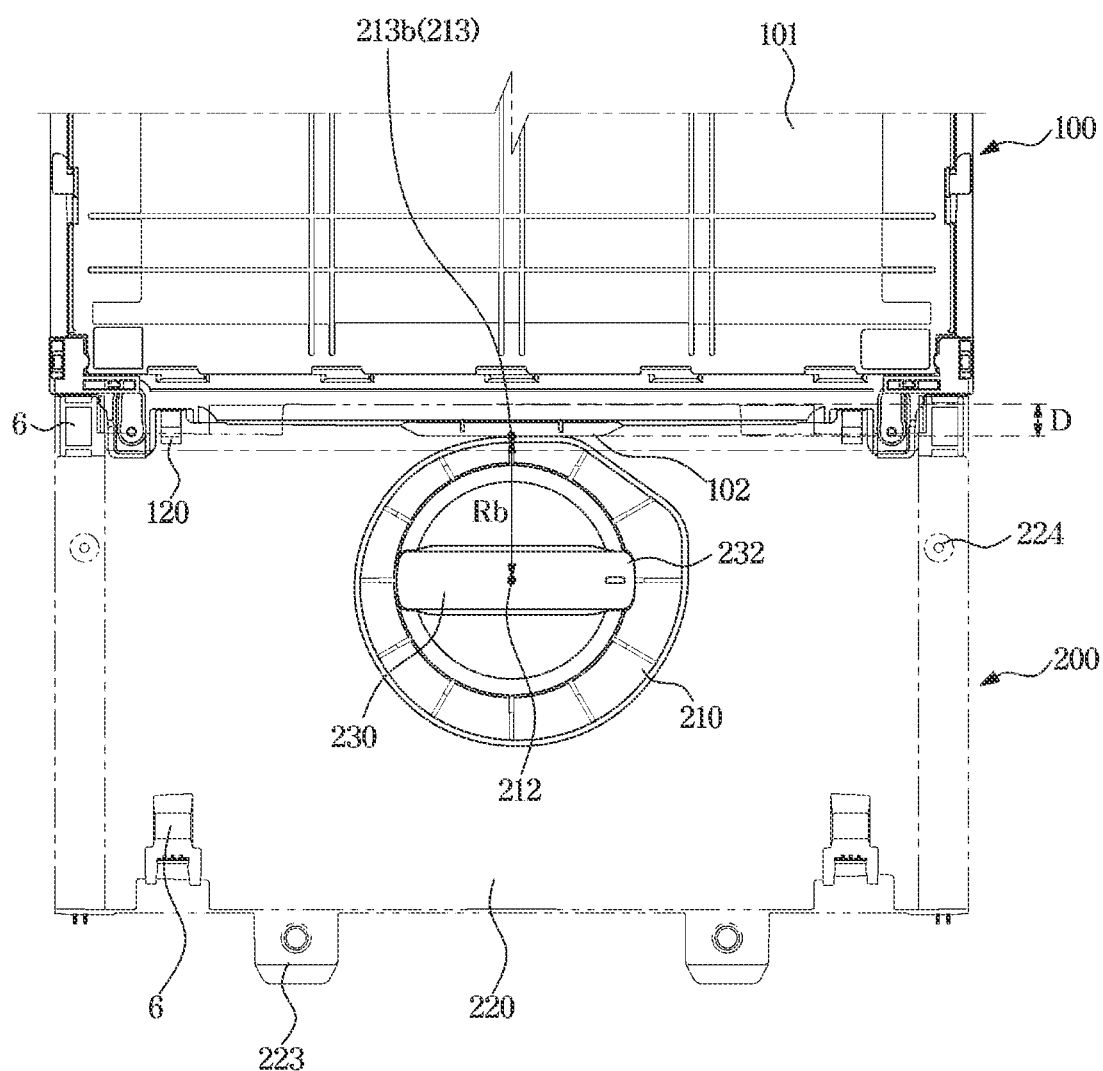
FIG. 11 illustrates a state in which the cam contact surface is most closely spaced apart from the rotation axis of the air conditioner according to an embodiment of the disclosure.

FIG. 10 illustrates a state in which the cam contact surface 213 is the farthest spaced apart from the rotation axis 111 of the air conditioner according to an embodiment of the disclosure, and FIG. 11 illustrates a state in which the cam contact surface 213 is most closely spaced apart from the rotation axis 211 of the air conditioner according to an embodiment of the disclosure.

Hereinafter a specific shape of the cam 210 and a specific structural relationship between the cam 210 and the panel assembly 100 will be described with reference to FIGS. 10 and 11.

The user may grasp the cam handle 230 by hand to rotate the cam handle 230 in the clockwise direction or in the counterclockwise direction B. The following description is based on the user rotating the cam handle 230 in the counterclockwise direction B as illustrated in FIG. 10.

When a state in which the cam 210 and the panel assembly 100 are in contact with each other at a specific point in time is referred to as a first state, a second state may be defined as a state of being rotated in the counterclockwise direction B more than in the case of the first state.

The cam 210 may include the cam contact surface 213 formed along the rotation direction of the cam 210.

A first contact portion 213a refers to the cam contact surface 213 in which the cam 210 and the panel assembly 100 are in contact with each other in the first state. A second contact portion 213b refers to the cam contact surface 213 in which the cam 210 and the panel assembly 100 are in contact with each other in the second state.

The cam contact surface 213 may include the first contact portion 213a and the second contact portion 213b formed to be in contact with the panel assembly 100 at different heights. In other words, the cam contact surface 213 may include the first contact portion 213a and the second contact portion 213b positioned to support the panel assembly 100 by moving up and down according to the rotation of the cam 210.

The first contact portion 213a may be spaced apart from the rotation axis 211 of the cam 210 by a first distance Ra, and the second contact portion 213b may be spaced apart from the rotation axis 211 by a second distance Rb to be in contact with the panel assembly 100 at a position lower than a position where the first contact portion 213a is in contact with the panel assembly 100, thereby ascending and descending the panel assembly 100.

For example, referring to FIGS. 10 and 11, the cam 210 may be configured such that the distance from the rotation center 212 of the cam 210 to the cam contact surface 213 where the cam 210 and the panel assembly 100 are in contact with each other decreases (decreases from Ra to Rb) as the cam 210 rotates in the counterclockwise direction B to increase the rotation angle of the cam 210, thereby descending the panel assembly 100 by D. As illustrated in FIG. 11, the user may separate the panel assembly 100 from the main body 1 in a state in which the cam contact surface 213 is located closest to the rotation axis 211.

Conversely, the user may ascend the panel assembly 100 by rotating the cam 210 in the clockwise direction (reverse direction of B), and then fix the panel assembly 100 to the main body 1.

Referring to FIGS. 10 and 11, a cam friction pad 102 may be provided at a portion where the panel assembly 100 and the cam 210 are in contact with each other. Specifically, the panel assembly 100 may include the cam friction pad 102 provided in a region 300 in which the lower end of the panel assembly 100 and the cam 210 are in contact with each other and protruding from the panel assembly 100 toward the cam 210. The cam friction pad 102 may be configured to be detachable from the panel assembly 100. Specifically, the cam friction pad 102 is disposed at the lower end of the panel frame 101 and may be configured to be detachable from the panel frame 101.

When the cam friction pad 102 is worn due to repeated rotation of the cam 210, the user may easily replace the cam friction pad 102 after separating the panel assembly 100 and the cam assembly 200 from the main body 1. In order to reduce noise that may occur when the cam 210 rotates in contact with the panel assembly 100, the cam friction pad 102 may be formed of a material different from the panel frame 101.

Figure 12:
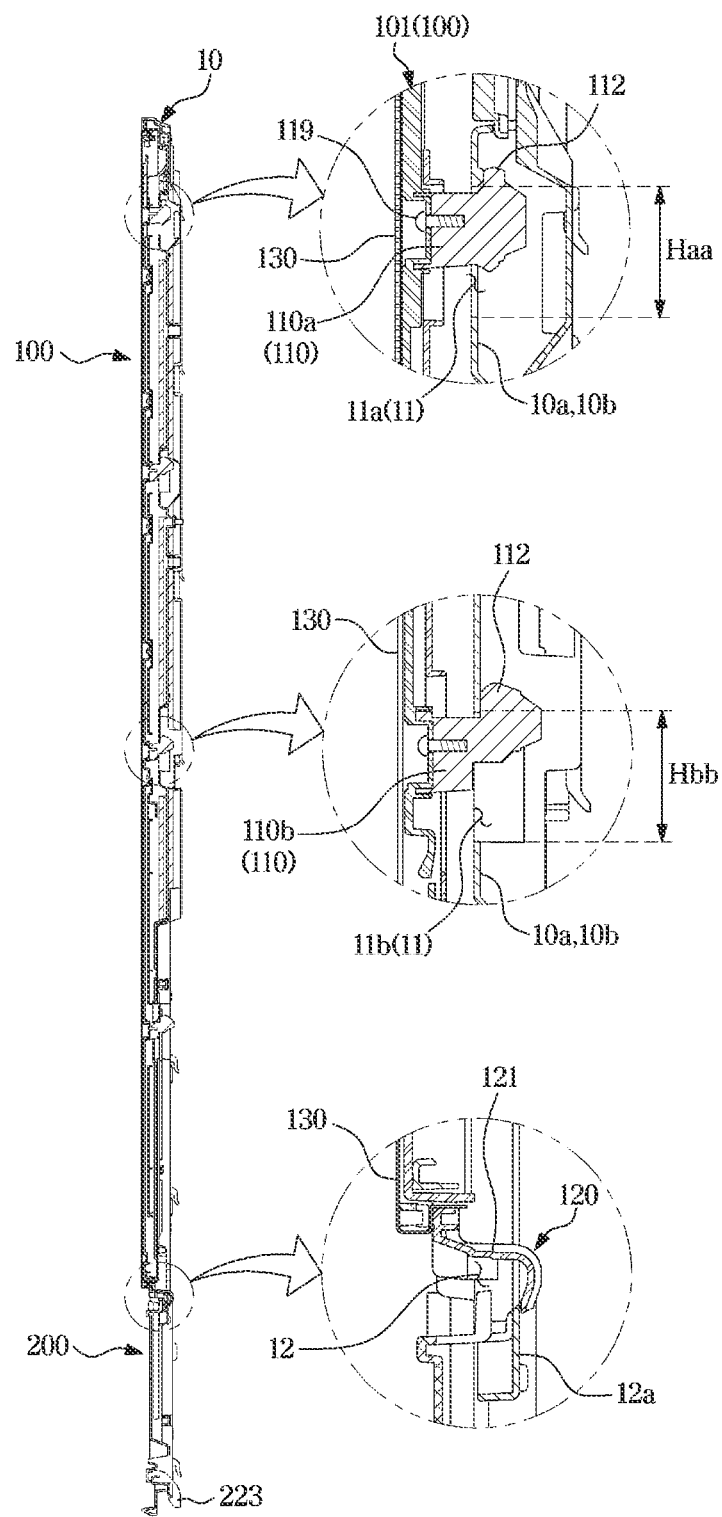
FIG. 12 is a cross-sectional view taken along line X-X in FIG. 3 in the state in which the cam contact surface is the farthest spaced apart from the rotation axis of the cam of the air conditioner according to an embodiment of the disclosure.
Figure 13:
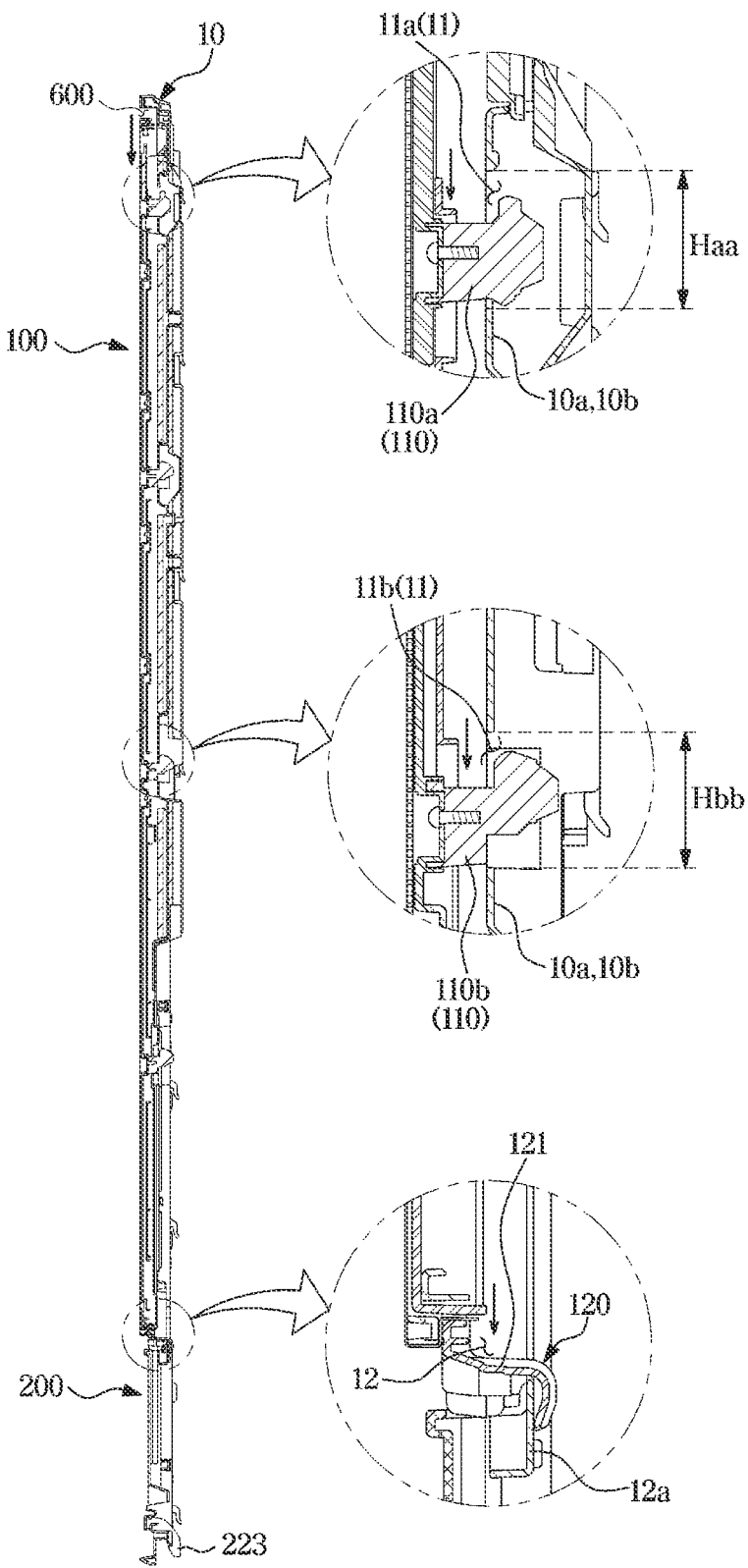
FIG. 13 is a cross-sectional view taken along line X-X in FIG. 3 in the state in which the cam contact surface is most closely spaced apart from the rotation axis of the cam of the air conditioner according to an embodiment of the disclosure.

FIG. 12 is a cross-sectional view taken along line X-X in FIG. 3 in the state in which the cam contact surface 213 is the farthest spaced apart from the rotation axis of the cam 210 of the air conditioner according to an embodiment of the disclosure, and FIG. 13 is a cross-sectional view taken along line X-X in FIG. 3 in the state in which the cam contact surface 213 is most closely spaced apart from the rotation axis of the cam 210 of the air conditioner according to an embodiment of the disclosure.

As illustrated in FIGS. 12 and 13, the lower hook 120 may be configured not to be separated from the lower hook groove 12 even when the panel assembly 100 is ascended by the rotation of the cam 210. That is, the lower hook 120 may be configured not to be separated from the lower hook groove 12 even when the user ascends the panel assembly 100 by rotating the cam 210 in the clockwise direction (reverse direction of B) and then fixes the panel assembly 100 to the main body 1 as illustrated in FIG. 12, as well as in a state in which the panel assembly 100 is erected perpendicular to the ground and the upper hook 110 is inserted into the upper hook groove 11 as illustrated in FIG. 13. Specifically, the lower hook 120 may be configured to be supported by the lower hook support flange 12a without being separated from the lower hook groove 12.

The lower hook 120 may perform a function of guiding the position of the panel assembly 100 with respect to the main body 1 by being preferentially caught on the lower hook groove 12 in a process in which the user tilts the panel assembly 100 to approach the main body 1 in order to couple the separated panel assembly 100 to the main body 1 of the air conditioner.

Thereafter, in a process in which the panel assembly 100 is ascended by the rotation of the cam 210, the lower hook 120 may perform a function of supporting the panel assembly 100 so that a lower end portion of the panel assembly 100 is not lifted to the front of the air conditioner and the panel assembly 100 is stably ascended.

As illustrated in FIG. 13, when the user erects the panel assembly 100 perpendicular to the ground and inserts the upper hook 110 into the upper hook groove 11, the upper hook 110 is in a state of being inserted into the upper hook groove 11 but may not be caught on the upper hook groove 11. In this state, an upper end of the lower hook 120 may maintain a state of being coupled to the main frame 10 mainly by a magnetic force acting between the sliding magnet 140 and the sliding plate 14.

When the user ascends the lower hook 120 by rotating the cam 210 in the clockwise direction (reverse direction of B), the upper hook 110 may be caught on the upper hook groove 11. In this state, the panel assembly 100 may more firmly maintain the state of being coupled to the main frame 10 by the upper hook 110 being caught on the upper hook groove 11, as well as by the magnetic force acting between the sliding magnet 140 and the sliding plate 14.

When the user rotates the cam 210 in the counterclockwise direction B to lower the panel assembly 100 by D (see FIG. 11), the panel assembly 100 may be changed to a state of being detachable from the main frame 10. As illustrated in FIG. 13, when the panel assembly 100 is descended by D (see FIG. 11), the gap 600 may be formed at an upper end of the front surface of the air conditioner by this motion. The gap 600 may be formed to have a size corresponding to D (see FIG. 11). The panel assembly 100 may be separated from the main body 1 by putting his or her hand into the gap 600 and pulling the panel assembly 100 toward the user to exert an external force.

As is apparent from the above, the disclosure can provide an air conditioner capable of easily separating a front panel from a main body by implementing a lifting structure of a panel using a cam provided to vary a distance between a rotation axis and a contact point of the panel.

Further, the disclosure can provide an air conditioner capable of preventing falling of a panel that may occur in a process of separating the pan& from the main body using an upper hook, a lower hook and a magnetic force and preventing a fan from operating when the pan& is separated from the main body.

While the disclosure has been particularly described with reference to exemplary embodiments, it should be understood by those of skilled in the art that various changes in form and details may be made without departing from the spirit and scope of the disclosure.

What is claimed is:
1. An air conditioner comprising:
a main body;
a panel assembly, coupled to the main body, to cover a front surface of the main body; and
a cam assembly below the panel assembly and comprising a cam having a cam contact surface with a first contact portion and a second contact portion, wherein the first contact portion is farther from a rotation axis of the cam than the second contact portion so that the cam is rotatable between
- a first state in which the first contact portion contacts the panel assembly so that the panel assembly is in an ascended position in which the panel assembly is fixable to the main body, and
- a second state in which the second contact portion contacts the panel assembly so that the panel assembly is in a descended position, lower than the ascended position, in which the panel assembly is separable from the main body, when the cam is rotated from the first state to the second state, contact of the cam contact surface with panel assembly causes the panel assembly to move from the ascended position to the descended position, and when the cam is rotated from the second state to the first state, contact of the cam contact surface with the panel assembly causes the panel assembly to move from the descended position to the ascended position.

2. The air conditioner according to claim 1, wherein
the rotation axis of the cam is parallel to ground, and
the cam assembly is configured to be detachable from the main body from in front of the main body.

3. The air conditioner according to claim 1, wherein
the panel assembly comprises a lower hook formed at a lower end of the panel assembly,
the main body comprises a lower hook groove formed at a position corresponding to the lower hook of the main body so that the lower hook is caught on the lower hook groove, and
the lower hook is configured so as to not be separated from the lower hook groove when the panel assembly moves from the descended position to the ascended position by the rotation of the cam from the second state to the first state.

4. The air conditioner according to claim 1, wherein
the cam assembly further comprises a cam fixing frame and a cam handle disposed on a front surface of the cam fixing frame,
the cam is disposed on a rear surface of the cam fixing frame, and
the cam handle and the cam are coupled to each other with the cam fixing frame therebetween.

5. The air conditioner according to claim 4, wherein
the cam fixing frame comprises a handle seating groove formed on the front surface of the cam fixing frame to correspond to a shape of the cam handle, and
a rim of the cam handle is formed to be seated in the handle seating groove.

6. The air conditioner according to claim 5, wherein
the cam fixing frame further comprises a stopper formed in the handle seating groove,
the cam handle comprises a protrusion protruding from the rim, and
the protrusion is configured to restrict the rotation of the cam by being caught on the stopper.

7. The air conditioner according to claim 1, further comprising
a cam assembly cover disposed in front of the cam assembly and coupled to the cam assembly to cover the cam assembly.

8. The air conditioner according to claim 7, wherein
the panel assembly further comprises a sliding magnet mounted on an upper end of the panel assembly, and
the main body comprises a sliding plate provided at a position of the main body corresponding to the sliding magnet and configured such that the sliding magnet slides while being in contact with the sliding plate by a magnetic force.

9. The air conditioner according to claim 7, wherein
the panel assembly further comprises a lead magnet mounted on the panel assembly, and
the main body comprises a reed switch provided at a position of the main body corresponding to the lead magnet and configured to stop rotation of a fan of the aft conditioner when the panel assembly is separated from the main body.

10. The air conditioner according to claim 1, wherein
the panel assembly comprises an upper hook comprising a body protruding from the panel assembly toward a rear of the panel assembly and configured to be inserted into an upper hook groove formed at a position of the main body corresponding to the upper hook, and
the upper hook is configured such that, when the panel assembly moves from the descended position to the ascended position by the rotation of the cam from the second state to the first state, the upper hook is caught on the upper hook groove.

11. The aft conditioner according to claim 10, wherein
the panel assembly further comprises a panel frame corresponding to a shape of the front surface of the main body, and a front cover disposed in front of the panel frame to be coupled to the panel frame and configured to cover electric components and a fan inside the main body so that the electric components and the fan are not visible from outside the air conditioner, and
the upper hook is configured to protrude from the panel frame.

12. The air conditioner according to claim 10, wherein
the upper hook comprises a locking portion protruding upward from one end of the body.

13. The air conditioner according to claim 12, wherein
the upper hook comprises a first upper hook and a second upper hook,
the first upper hook is positioned above the second upper hook on the panel assembly, and
a protruding height of the locking portion of the first upper hook is provided lower than a protruding height of the locking portion of the second upper hook.

14. The air conditioner according to claim 13, wherein
the upper hook groove is formed to a height corresponding to the upper hook so that the upper hook is inserted into the upper hook groove without the locking portion being caught on the upper hook groove.

15. The air conditioner according to claim 1, wherein
the panel assembly further comprises a cam friction pad provided in a region where a lower end of the panel assembly and the cam contact surface are in contact with each other, and protruding from the panel assembly toward the cam, and
the cam friction pad is configured to be detachable from the panel assembly.

16. An air conditioner comprising:
a main frame disposed on a front surface of a main body of the air conditioner;
a fan provided inside the main body;
a cam assembly comprising a cam and disposed at a lower end of the main frame; and a panel positioned above the cam assembly to be in contact with the cam and configured to cover the front surface so that the fan is not visible from outside the air conditioner, wherein the cam has a cam contact surface with a first contact portion and a second contact portion the first contact portion is spaced apart from a rotation axis of the cam by a first distance, and the second contact portion is spaced apart from the rotation axis by a second distance that is less than the first distance, so that the cam is rotatable between a first state in which the first contact portion contacts the panel so that the panel is in an ascended position in which the panel is fixable to the main body, and a second state in which the second contact portion contacts the panel so that the panel is in a descended position, lower than the ascended position, in which the panel is separable from the main body, when the cam is rotated from the first state to the second state, contact of the cam contact surface with panel causes the panel to move from the ascended position to the descended position, and when the cam is rotated from the second state to the first state, contact of the cam contact surface with the panel causes the panel to move from the descended position to the ascended position.

17. The air conditioner according to claim 16, wherein the cam assembly further comprises a cam fixing frame and a cam handle disposed on a front surface of the cam fixing frame, the cam is disposed on a rear surface of the cam fixing frame, and the cam handle and the cam are coupled to each other with the cam fixing frame therebetween.

18. The air conditioner according to claim 17, wherein the cam assembly further comprises a cam fixing hook protruding from the cam fixing frame, the main frame comprises a cam fixing groove provided at a position corresponding to the cam fixing hook, and the cam assembly is configured to be detachable from the main frame.

19. The air conditioner according to claim 17, wherein the cam fixing frame further comprises a stopper formed in a groove, the cam handle comprises a protrusion protruding from a rim, and the protrusion is configured to restrict the rotation of the cam by being caught on the stopper.

20. The air conditioner according to claim 16, wherein the panel comprises an upper hook protruding from the panel toward a rear of the panel and configured to be inserted into an upper hook groove formed at a position of the main body corresponding to the upper hook, and the upper hook is configured such that the panel is ascended by the rotation of the cam and is caught on the upper hook groove.

* * * * *